(12) United States Patent
Rakshit et al.

(10) Patent No.: US 11,086,907 B2
(45) Date of Patent: Aug. 10, 2021

(54) GENERATING STORIES FROM SEGMENTS CLASSIFIED WITH REAL-TIME FEEDBACK DATA

(71) Applicant: INTERNATIONAL BUSINESS MACHINES CORPORATION, Armonk, NY (US)

(72) Inventors: Sarbajit K. Rakshit, Kolkata (IN); Martin G. Keen, Cary, NC (US); James E. Bostick, Cedar Park, TX (US); John M. Ganci, Jr., Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 16/176,296

(22) Filed: Oct. 31, 2018

(65) Prior Publication Data

US 2020/0134084 A1 Apr. 30, 2020

(51) Int. Cl.
*G06F 16/28* (2019.01)
(52) U.S. Cl.
CPC .................. *G06F 16/285* (2019.01)
(58) Field of Classification Search
CPC .................................................. G06F 16/285
See application file for complete search history.

(56) References Cited

U.S. PATENT DOCUMENTS

| | | | |
|---|---|---|---|
| 9,299,268 B2 | 3/2016 | Aravkin et al. | |
| 2009/0133047 A1* | 5/2009 | Lee | A61B 5/0205 725/10 |
| 2009/0327896 A1* | 12/2009 | Pall | H04L 67/025 715/730 |
| 2010/0332959 A1* | 12/2010 | Mitchell | H04N 21/234336 715/202 |
| 2011/0295392 A1 | 12/2011 | Cunnington et al. | |
| 2013/0290430 A1* | 10/2013 | Yung | G06F 16/24578 709/204 |
| 2014/0067834 A1* | 3/2014 | Hutten | G06F 16/24 707/754 |
| 2014/0113264 A1 | 4/2014 | Moon | |

(Continued)

OTHER PUBLICATIONS

Blom et al., "Emotional Storytelling," IEEE Virtual Reality Conference, Workshop "Virtuality Structure," Bonn, Germany, pp. 23-27, 2005, 5 pages.

(Continued)

*Primary Examiner* — Pierre M Vital
*Assistant Examiner* — Andrew N Ho
(74) *Attorney, Agent, or Firm* — Anthony V England; Andrew D. Wright; Roberts, Calderon, Safran & Cole, P.C.

(57) ABSTRACT

Systems and methods for generating stories from segments classified with real-time feedback data are disclosed. In embodiments, a method includes sending, by a computing device, a story to a user computer device, wherein the story is associated with target story goals; receiving, by the computing device, real-time user feedback data of a consumer of the story; determining, by the computing device, that the real-time feedback data does not match the target story goals; and dynamically modifying, by the computing device, the story based on the determining that the real-time feedback data does not match the target story goals.

19 Claims, 6 Drawing Sheets

(56) References Cited

U.S. PATENT DOCUMENTS

| | | | |
|---|---|---|---|
| 2014/0324717 A1* | 10/2014 | Ayers | G06Q 50/01 |
| | | | 705/319 |
| 2015/0193089 A1* | 7/2015 | Berlin | G06Q 10/10 |
| | | | 715/731 |
| 2015/0347560 A1* | 12/2015 | Skrobotov | H04N 21/472 |
| | | | 707/738 |
| 2016/0042648 A1 | 2/2016 | Kothuri | |
| 2016/0379139 A1* | 12/2016 | Eldar | G06F 16/35 |
| | | | 706/12 |
| 2017/0078621 A1* | 3/2017 | Sahay | G06F 40/186 |

OTHER PUBLICATIONS

Dinonen et al., "Designing a Story Database for Use in Automatic Story Generation", ICEC 2006, Lecture Notes in Computer Science, vol. 4161,Springer, Berlin, Heidelberg, 2006, 4 pages.

Anonymous, "Method and System for Context-aware Story Telling Using Artificial Intelligence", IP.com Disclosure Number: IPCOM000252509D, Jan. 19, 2018, 4 pages.

Anonymous, "Cognitive Social Media Travel Story Creation", IP.com Disclosure Number: IPCOM000247473D, Sep. 9, 2016, 4 pages.

* cited by examiner

GENERATING STORIES FROM SEGMENTS CLASSIFIED WITH REAL-TIME FEEDBACK DATA

BACKGROUND

The present invention relates generally to automated content generation and, more particularly, to generating stories from segments classified with real-time user feedback data.

A variety of contextual or cognitive analysis tools have been developed for determining the content and context of various forms of data, including text, audio and visual data. Contextual tools include natural language processing tools, image recognition tools, speech to text analysis tools, and biofeedback tools. Contextual information associated with content can be utilized for a variety of purposes, including predicting emotional reactions of users to the content, and creating text to accompany visual and/or audio data.

SUMMARY

In an aspect of the invention, a computer-implemented method includes: sending, by a computing device, a story to a user computer device, wherein the story is associated with target story goals; receiving, by the computing device, real-time user feedback data of a consumer of the story; determining, by the computing device, that the real-time feedback data does not match the target story goals; and dynamically modifying, by the computing device, the story based on the determining that the real-time feedback data does not match the target story goals.

In another aspect of the invention, there is a computer program product including a computer readable storage medium having program instructions embodied therewith. The program instructions are executable by a computing device to cause the computing device to: capture, in real-time, user feedback data of consumers of a story during a story session, wherein the story comprises a plurality of story segments; map consumer emotions derived from the user feedback data to the story segments of the story; store metadata for each of the story segments in a story database to produce categorized story segments, wherein the metadata is based on the mapping of the consumer emotions; and generate a story from at least one of the categorized story segments based on the metadata matching a target emotion intended to be invoked by the story.

In another aspect of the invention, there is a system including a processor, a computer readable memory and a computer readable storage medium associated with a computing device. The system further includes: program instructions to receive user information including a target emotion to be invoked in a consumer; program instructions to determine target story goals based on the user information; program instructions to determine a subset of classified story segments from a plurality of available classified story segments in a story database, wherein the subset of classified story segments match the target story goals; and program instructions to generate a plurality of stories based on the subset of classified story segments, wherein each of the plurality of stories comprises a unique combination of classified story segments from the subset of classified story segments. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
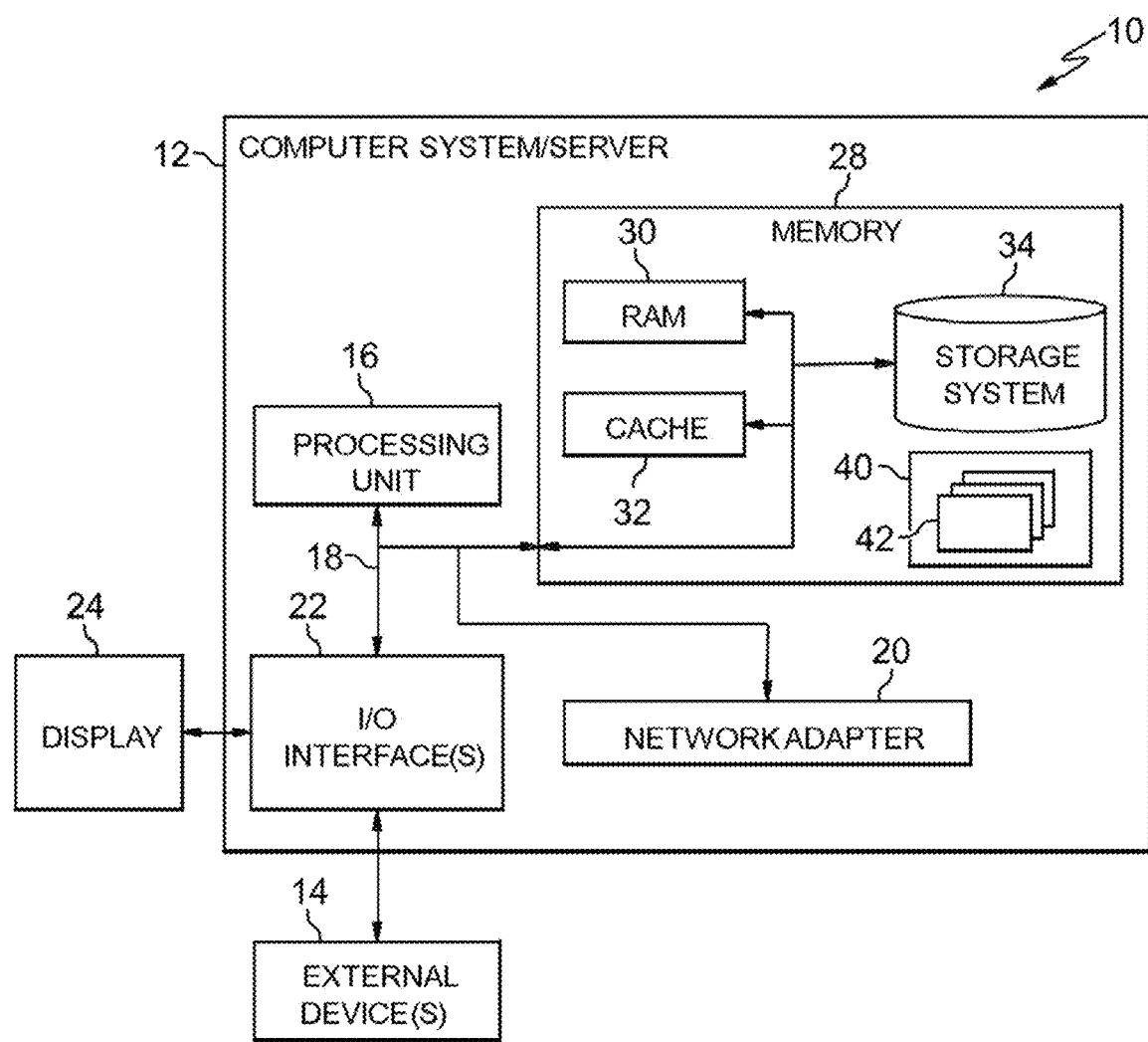
FIG. 1 depicts a computing infrastructure according to an embodiment of the present invention.

The present invention relates generally to automated content generation and, more particularly, to generating stories from segments classified with real-time user feedback data. In embodiments, a method is provided for using cognitive computer analysis to create a dynamic story from available story segments of learned emotion that achieve the desired story emotion or reaction of a target audience. In aspects, a cognitive system is provided to perform an analysis of all story content segments available to determine possible stories, and perform emotion mapping for story segments that can be dynamically generated into a story for an expected audience emotion or behavior. In implementations, cognitive software of the invention provides a method of associating learned real-time biometric emotion feedback of audience members (stored as metadata) with a story segment. In aspects, software compares the real-time emotion feedback of audience members during a story telling session with desired story emotions, and dynamically modifies the story from available story segments to achieve desired audience emotions.

Embodiments of the present invention constitute improvements in the technical field of computer-based content generation by enabling the creation of possible stories from story segments with a defined emotional reaction of an audience. Aspects of the invention perform the unconventional steps of: capturing and evaluating real-time emotion feedback (e.g., biometric, facial, or audio) to determine if audience members' emotional feedback for a story/story segments matches a desired emotion; and dynamically generating a new or modified story from available story segments to achieve the desired emotional reaction. Thus, systems of the present invention are configured to perform unconventional functions, resulting in improved story generating computing devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to microcode, device drivers, redundant processing units, external disk drive arrays, RAID systems, tape drives, and data archival storage systems, etc.

Figure 2:
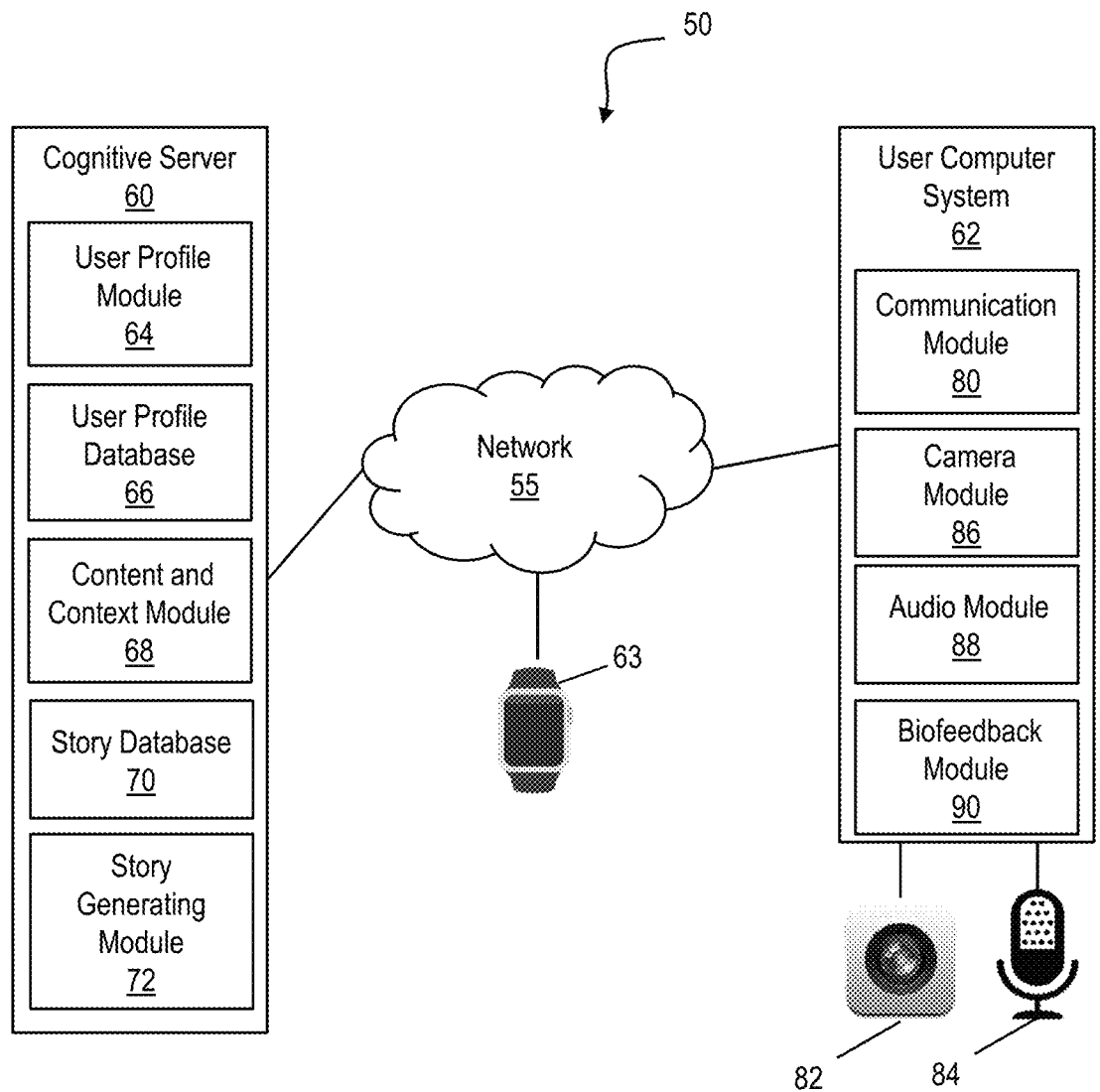
FIG. 2 shows an exemplary environment in accordance with aspects of the invention.

FIG. 2 shows an exemplary cognitive story generating environment 50 in accordance with aspects of the invention. The cognitive story generating environment 50 includes a network 55 connecting a cognitive server 60 to one or more user computer systems 62 (e.g., laptop, desktop, or mobile computing device and associated electronic devices) and/or computing devices 63 (e.g., wearable computing devices). In aspects, the cognitive server 60 comprises the computer system 12 of FIG. 1, and is connected to the network 55 via the network adapter 20 of FIG. 1. The cognitive server 60 may be configured as a special purpose computing device that is part of a content supplying infrastructure (e.g., streaming video, slide presentation content, etc.). The cognitive server 60 may be configured to communicate with plural different user computer systems 62 simultaneously, and perform search functions separately for each user computer system 62 independent of the others.

The network 55 may be any suitable communication network or combination of networks, such as a local area network (LAN), a general wide area network (WAN), and/or a public network (e.g., the Internet). In aspects, the user computer system 62 comprises components of the computing device 12, and may be a desktop computer, laptop computer, tablet computer, smartphone, smart television, cable box, or combination of computing devices and associated electronic devices, for example.

Still referring to FIG. 2, the cognitive server 60 may utilize one or more program modules (e.g., program module 42 of FIG. 1) to perform one or more functions described herein. In embodiments, the cognitive server 60 includes: a component to learn real-time emotional feedback of audience members (consumers) of a story and/or specific story segments; a component to associate metadata of user emotions with respective story segments; a component to perform analysis of story content to determine possible story segments in a story to derive a desired user emotion; a component to perform comparisons of real-time emotion feedback with desired user emotions for a story; and a component to evaluate and dynamically modify story segments included in a story based on desired user emotional reactions.

In embodiments, a user profile module 64 is configured to receive user profile information from multiple users (e.g., presenters and viewers) for storage in a user profile database 66. In aspects, the user profile module 64 is configured to present interactive questionnaires to the user computer systems 62 to obtain user profile data from a plurality of users.

In implementations, a content and context module 68 (hereafter context module 68) is configured to determine target story goals based on information received from a user.

The term target story goal as used herein refers to desired content for a story, and the desired purpose of the story and/or user reaction to the content (e.g., emotional reaction, physical reaction, etc.). For example, the target story goal may include the desire to pursued audience members, influence audience members, and/or invoke particular emotions in the audience members. Story telling goals may be tied to business objectives, such as marketing, educational objectives such as teaching a subject, or entertainment objectives, for example. The term story as used herein refers to a unit of content, such as a presentation (e.g., live or streaming), which may comprise audio, visual, text-based content, or combinations thereof.

In aspects, the context module 68 is further configured to receive real-time user feedback data from users (audience members) participating in a story session, and associate context data with predefined story segments in a story database 70 based on the real-time user feedback data. In implementations, the context module 68 is configured to determine if the real-time user feedback data matches the target story goal.

In implementations, a story generating module 72 is configured to analyze available story content to determine predefined story segments (subsets of content) in the story database 70 that match the target story goals. In embodiments, the story generating module 72 generates a list of possible combinations of predefined story segments that match the target story goals, wherein each possible combination is a possible story. In aspects, the story generating module 72 presents story options to a user for selection. In implementations, the story generating module 72 provides the story to one or more users (e.g., the user that requested the story or another user). In aspects, the story generating module 72 is configured to present a speaker or presenter with one or more options to modify the story being presented based on a determination by the context module 68 that the real-time user feedback data does not match the target story goals. In such cases, the story generating module 72 is configured to receive user-selected options to modify the story. In implementations, the story generating modules 72 dynamically modifies the story being presented in a story session in real-time to include one or more alternative predefined content segments associated with the target story goals.

In embodiments, the user computer system 62 runs a browser application program via a communication module 80, that provides an interface (e.g., a web page) by which a user may view content generated by the cognitive server 60. In embodiments, the user computer system 62 includes one or more data gathering tools, such as a camera 82 for gathering image data and a microphone 84 for gathering audio data. Additional data gathering tools such as the wearable device 63 (e.g., a smartwatch) may be utilized to gather biofeedback data (e.g., heartrate, etc.). In aspects, the user computer system 62 includes a camera module 86 for receiving data from one or more cameras 82, and communicating the data to the cognitive server 60; an audio module 88 for receiving data from one or more microphones 84 and communicating the data to the cognitive server 60; and/or a biofeedback module 90 for receiving data from one or more biophysical sensing devices (e.g., computing device 63) and forwarding the data to the cognitive server 60.

The quantity of devices and/or networks in the cognitive story generating environment 50 is not limited to what is shown in FIG. 2. In practice, cognitive story generating environment 50 may include additional devices and/or networks; fewer devices and/or networks; different devices and/or networks; or differently arranged devices and/or networks than illustrated in FIG. 2. In addition, in some implementations, one or more of the components or modules of the devices in the cognitive story generating environment 50 may perform one or more functions described as being performed by another one or more of the components or modules. For example, the context module 68 and story generating module 72 may be combined, or share the performance of various method steps of the present invention described herein.

Figure 3A:
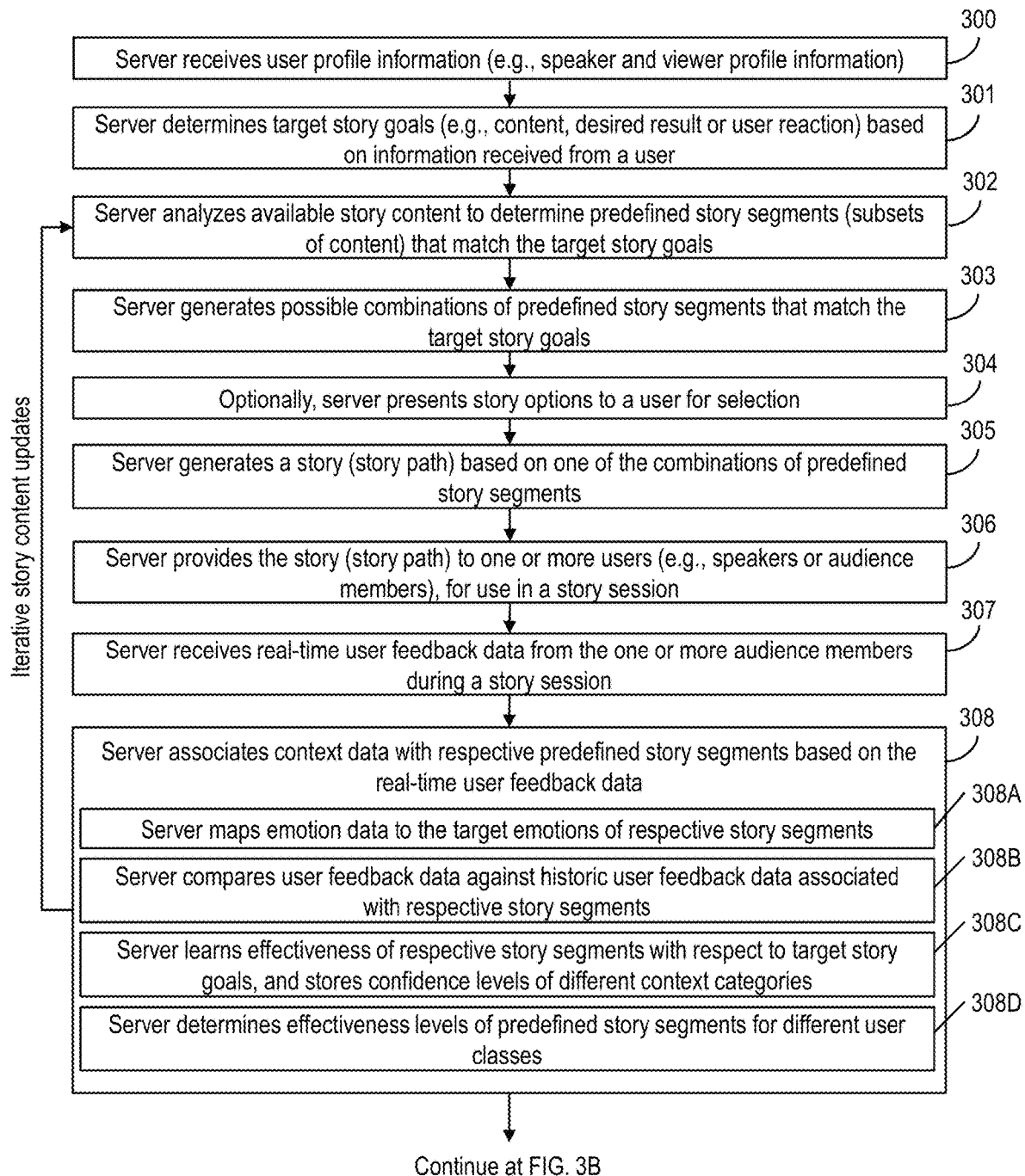
FIGS. 3A and 3B show a flowchart of steps of a method in accordance with aspects of the invention.
Figure 3B:
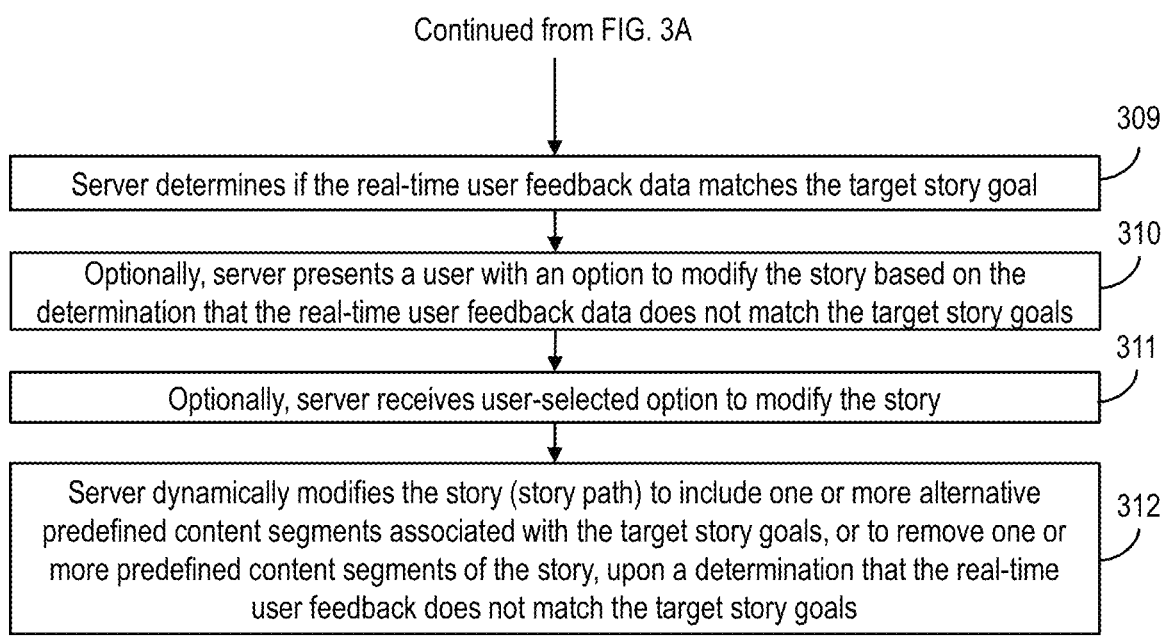

FIGS. 3A and 3B show a flowchart of a method in accordance with aspects of the invention. Steps of the method of FIG. 3 may be performed in the environment illustrated in FIG. 2, and are described with reference to elements shown in FIG. 2.

At step 300, the cognitive server 60 receives user profile information from a user. A user may be a presenter of a story generating in accordance with methods of the present invention, or an audience member or viewer (i.e., a consumer) of a story session. User profile information may include preferences of the user, an occupation of the user, skill level of the user with respect to different topics, education level, geographic location, age, or any other information authorized by the user to be collected by the cognitive server 60. The cognitive server 60 may receive user profile data directly from a user or from other authorized sources (e.g., email, social media, etc.). In aspects, the cognitive server 60 may present a user with a guided questionnaire to assist the cognitive server 60 in gathering relevant user profile information. In embodiments, the user profile module 64 of the cognitive server 60 implements step 300.

At step 301, the cognitive server 60 determines target story goals of a user based on information received from the user. In aspects, the user may be a user who intends to present certain content to an audience for business, entertainment, or educational purposes, for example. In implementations, the cognitive server 60 presents the user with a questionnaire in order to obtain target story goal information from the user. As noted previously, the term target story goal refers to desired content for a story, and the desired purpose of the story and/or user reaction to the content (e.g., emotional reaction, physical reaction, etc.). As noted above, the term story as used herein refers to a unit of content, such as a presentation (e.g., live or streaming), which may comprise audio, visual, text-based content, or combinations thereof. For example, a story of the present invention may be in the form of text, a slide presentation, audio, video, or combinations thereof.

A target story goal in accordance with the present invention may be, for example, to educate associates in a company X regarding a new product or line of business Y. In this example, the context is an educational one, and the audience is an audience familiar with the company X. In another example, the target story goal is to market the new product or line of business Y to customers of company X. In this second example, the context is a marketing one, and the audience is an audience who may not be familiar with company X. Information received from the user for the purposes of determining a target story goal may include, for example, the purpose of the story session (e.g., education or marketing), the type of audience (e.g., internal or external clients), time goals (e.g., keep viewers' attention for 20 minutes), characteristics of the speaker/presenter (if any), and one or more emotional tones of story (e.g., humorous, inspirational, sympathetic, etc.). In aspects, the story generating module 72 implements step 302.

At step 302, the cognitive server 60 analyzes available story content from the story database 70 to determine predefined story segments (e.g., subsets of content) that match the target story goals determined at step 301. In embodiments, the cognitive server 60 selects predefined story segments from categorized story segments stored in the story database 70. In aspects, the story segments are associated with context data based on real-time user feedback data in accordance with step 307 detailed below. In aspects, context data associated with the story segments include user reactions associated with each of the respective story segments (e.g., emotional reactions, level of attentiveness of audience members, etc.) as well as content, tone (e.g., humorous, dark, scary, etc.), duration, and/or other data descriptive of the content or context of the respective story segments. In embodiments, the context data includes mapping data, which maps interconnectedness of respective story segments. For example, it may be necessary to present slides from a slide presentation in a certain order, or always group one or more slides together in a presentation. Inter-relationships of the story segments in the story database 70 may be saved by the cognitive server 60 using available data mapping and storage methods.

Still referring to step 302, in one example, the target story goals determined at step 301 include educating associates in a company X regarding a new product Y, wherein the story is intended to be funny (i.e., invoke a response of humor in an audience). In this example, the cognitive server 60 recognizes 200 slides associated with the new product Y, and determines that a subset of 50 slides is appropriate for the internal audience of associates. The cognitive server 60 recognizes a speaker/presenter (e.g., a user who input target story goals at 301) is associated with the skill set of being able to convey humorous information effectively (based on user profile information). Accordingly, the cognitive server 60 identifies a further subset of 20 slides associated with invoking a response of humor in an audience. In aspects, the story generating module 72 of the cognitive server 60 implements step 302.

At step 303, the cognitive server 60 generates possible combinations of the predefined story segments of step 302 that match the target story goal determined at step 301, wherein each combination is a unique story (i.e., story option). In implementations, the cognitive server 60 ranks a list of the possible combinations based on a best fit with the target story goals and/or the user participants (e.g., speaker/presenters and audience members). It should be understood that context data associated with each predefined story segment (e.g., a presentation slide) may be developed iteratively via method steps of the present invention. Accordingly, over time, context data associated with each predefined story segment may change and evolve to provide more accurate information regarding a fit with a target story goal. For example, each time the company X obtains real-time user feedback data regarding a story session for the new product Y, the story database 70 is enriched with additional context data for the particular story segments utilized in the story session. Thus, as different story sessions (e.g., slide presentations) are utilized in story sessions conducted over time for different departments or regions of the company X, the knowledge accumulated in the story database 70 will grow iteratively. See the discussion of step 308 of FIG. 3 below for additional details regarding classification of story content. In aspects, the story generating module 72 of the cognitive server 60 implements step 303.

At step 304, the cognitive server 60 optionally presents one or more story options to a user for selection by the user. In aspects, the story generating module 72 of the cognitive server 60 provides a selection of story options to a user via the communication module 80 of the user computer system 62. Optionally, the story generating module 72 presents a list of story options ordered by their ranking (e.g., ranked in order of fit to the target story goals). In one example, the cognitive server 60 presents a list of slide presentations on the topic of new product Y of company X, wherein each slide presentation is unique in its combination/order of individual slides. In this example, a rating system is presented with each story option (i.e., slide presentation) to inform a user regarding the fit of each story option to the target story goals.

At step 305, the cognitive server 60 generates a story based on one of the combinations of step 303. In implementations, the cognitive server 60 generates a story based on a user selection of one of the story options presented to them at step 304. Alternatively, the cognitive server 60 selects one of the story options based on a default setting, such as automatically selecting the story option with the best fit to the target story goals. In one example, the cognitive server 60 automatically selects a slide presentation from a plurality of slide presentations generated according to step 303, and generates the slide presentation based on slides (predefined story segments) from the story database 70. It should be understood that a variety of different story types may be generated in accordance with step 305, including slide presentations and audio/video presentations. In aspects, the story generating module 72 of the cognitive server 60 implements step 305.

At step 306, the cognitive server 60 provides the story generated at step 305 to one or more users (e.g. speakers or audience members), for use in a story session. In embodiments, the cognitive server 60 provides the story to a user who requested the story, such as a speaker or presenter of a slide presentation. In embodiments, the cognitive server 60 provides the story directly to one or more audience members, such as the intended consumers of the content of the story. In one example, the cognitive server 60 provides a slide presentation (story) to a speaker/presenter, who intends to present the slide presentation to an audience during a live story session. In another example, the cognitive server 60 provides an automated slide presentation directly to audience members via communication modules (e.g., communication module 80) of the users' respective user computer systems 62, wherein each user can participate in a story session via their respective user computer system 62. In a third example, the cognitive server 60 provides a streaming video to audience members via their respective user computer systems 62 (e.g., smart television). In aspects, the story generating module 72 of the cognitive server 60 implements step 306.

At step 307, the cognitive server 60 receives real-time user feedback data from users participating in a story session (i.e. consumers of the story). Real-time user feedback data may be in the form of emotion data derived from biofeedback data, image capture data, audio data, or a combination therefore, for example. In embodiments, modules of the user computer system 62 capture real-time user feedback data (e.g., image data, audio data, and biofeedback data) and send the data to the cognitive server 60, as either raw data or processed data. In implementations, biofeedback data such as heart rate data is obtained from the wearable device 63 of a story consumer (e.g., a smartwatch). In aspects, one or more cameras 82 may be utilized to capture facial expressions of one or more audience members, to provide feedback in the form of image data. In implementations, one or more microphones 84 within an environment of a user(s) may be used to capture audio data of audience members, to provide feedback in the form of audio data.

In embodiments, the user computer system 62 processes real-time user data to determine the meaning of the data with respect to an associated story segment of the story being consumed, and forwards the processed data to the cognitive server 60. In aspects, the context module 68 of the cognitive server 60 receives the real-time user feedback data and performs an analysis of the data to determine a meaning of the data with respect to an associated story segment of the story being consumed. For example, in aspects, the context module 68 receives real-time image data of audience members as they watch a story, and utilizes facial recognition tools and methods to determine facial expressions and associated emotions or reactions of the user to the predefined story segments of the story during the story session. In this example, the context module 68 may determine that audience members find slides 20-22 of a slide presentation (story) humorous, but lose interest (i.e., their attention starts to wander) at slide 30.

At step 308, the cognitive server 60 associates context data with respective predefined story segments utilized in the story based on the real-time user feedback data of step 307. A variety of data association and mapping techniques may be utilized in the implementation of step 308. Context data may be saved with the respective story segments in the form of metadata. In implementations, metadata associated with a story segment includes one or more of: a story segment identification (ID) number; a list of story segments that can be placed before; a list of story segments that can be placed after; and user response (emotion) attributes representative of the story segment (1–n). In aspects, context data associated with predefined story segments at step 308 includes data regarding the effectiveness of one or more of the predefined story segments with respect to different goals (e.g., effectiveness with respect to the goal of invoking humor, effectiveness with respect to retaining audience members' interest, etc.). In implementations, the cognitive server 60 may identify each consumer of a story and utilize user profile data of the consumers in the mapping of context data to story segments. In embodiments, the context module 68 of the cognitive server 60 implements step 308. Examples of additional steps that may be implemented in the performance of step 308 are set forth below with respect to steps 308A-308D.

At step 308A, the cognitive server 60 maps user emotion data obtained at step 307 to target emotions of respective predefined story segments of the story. For example, one or more predefined story segments may be associated with the goal of invoking a reaction of humor in an audience, or retaining audience members' attention/interest. In one example, the cognitive server 60 obtains user emotion data generated by facial recognition tools and methods, which is associated with predefined story segments of a slide presentation. In this example, the cognitive server 60 maps an actual user emotion detected (confusion) with an emotion which the story segment was intended to invoke (humor), and stores this information. The accumulative mapping of user emotions with intended emotions can be utilized by the cognitive server 60 to determine patterns in the effectiveness of predefined story segments, alone, and in combination. For example, the cognitive server 60 may recognize patterns in user responses to particular sequences of slides, wherein a first class of users tends to respond with humor and in a second class of users tends to respond with confusion.

At step 308B, the cognitive server 60 compares user feedback data to historic user feedback data associated with the predefined story segments of the story. This comparison data may be saved or utilized in further analysis steps, including step 308C below.

At step 308C, the cognitive server 60 determines or learns the effectiveness of the respective predefined story segments with respect to target story goals, and stores confidence levels for different context categories with the predefined story segments. In one example, the cognitive server 60 determines that, over time, a sequence of three slides meets a context category of invoking humor in audience members with a confidence of 80%, and maps this effectiveness data to the predefined story segments in the story database 70. In another example, the cognitive server 60 determine with 90% confidence that a particular slide (predefined story segment) invokes a loss of attention of users. It should be understood that step 308C may be performed based on multiple iterations of steps 306-308, whereby the cognitive server 60 learns the effectiveness of predefined story segments over time across multiple target story goals (e.g., educational goals, entertainment goals, marketing goals, particular subject matter, etc.) and users.

At step 308D, the cognitive server 60 determines or learns the effectiveness of the predefined story segments with respect to different user classes, and stores confidence levels for different user classes with the predefined story segments. In one example, the cognitive server 60 determines that, over time, a sequence of three slides meets a context category of invoking humor in audience members with a confidence of 80% for a first class of users (e.g., a first geographic region), but only invokes humor in audience members with a confidence of 50% for a second class of users (e.g., a second geographic region). Accordingly, the cognitive server 60 maps this effectiveness data for different user classes to the predefined story segments in the story database 70.

Turning to FIG. 3B, at step 309 the cognitive server 60 determines if the real-time user feedback data matches the target story goals determined at step 301 based on the real-time user feedback data received at step 307. In one example, the cognitive server 60 compares real-time feedback data from users viewing slide 20 of a 50 slide presentation, with target story goals, and determines that the real-time user feedback data indicates that slide 20 is invoking a humorous response in the audience, as intended. In another example, the cognitive server 60 compares the real-time feedback data with target story goals and determines that users' reactions indicate a loss of interest in the presentation at slide 20 of 50, which does not match the target story goal of educating the users. In embodiments, the context module 68 implements step 309.

At step 310, the cognitive server 60 optionally presents a user with one or more options to modify the story based on the determination at step 309 that the real-time user feedback data does not match the target story goals. The option presented to the user may be in the form of a list of alternative story options (e.g., story options from step 303 or newly generated story options). In aspects, the cognitive server 60 will determine a modified version of the story, which is preferable to the current version based on the real-time user feedback data. For example, in the case where the cognitive server 60 determines that audience members are losing interested in a presentation at slide 20 of 50, the cognitive server 60 may determine that replacing slides 21-25 with more humorous slides and cutting down the overall content of the presentation to 40 slides instead of 50 is desirable in light of the real-time user feedback data. In aspects, the cognitive server 60 presents such an option to the presenter of the story in real-time, enabling the presenter to adjust the story session in real-time to improve the outcome of the session. In embodiments, the cognitive server 60 presents such an option to an audience member consuming the story in real-time, enabling the audience member to adjust the story session in real-time to improve the outcome of the session. In embodiments, the story generating module 72 implements step 310.

In accordance with step 310, at step 311, the cognitive server 60 receives a user selection of an option to modify the story being presented in the story session. In aspects, the cognitive server 60 receives a user selection through the communication module 80 of a user computer system 62 (e.g., from a presenter or an audience member). In embodiments, the story generating module 72 implements step 310.

At step 312, the cognitive server 60 dynamically modifies the story to include one or more alternative predefined content segments associated with the target story goals, and/or to remove one or more predefined content segments of the story, upon a determination that the real-time user feedback data does not match the target story goals at step 309. In embodiments, the cognitive server 60 automatically modifies the story based on the real-time user feedback data during the story session. Alternatively, the cognitive server 60 modifies the story based on the real-time user feedback data upon receipt of the user option to modify the story at step 311. In implementations, the cognitive server 60 dynamically modifies a story streaming to one or more users (e.g., dynamically modifies streaming audio/video data). In aspects, the cognitive server modifies a story and sends the modified story to the user (e.g., speaker/presenter) in real-time during the story session. In a first example, a video streaming to a plurality of audience members is dynamically modified during a story session based on the real-time user feedback data. In a second example, a slide presentation is updated and the updated version presented to a speaker/presenter in real time such that the speaker/presenter can adjust their presentation of the story content dynamically based on the real-time user feedback data.

Based on the above, it can be understood that embodiments of the invention provide a system enabling dynamically generated stories for defined expected audience emotion or behavior. In implementations, each story segment is stored in the story database 70. A story is viewed, watched or listened to, depending on the type of story vehicle (text, video, audio). In implementations, the story generating environment 50 captures: biometric data from wearable devices (e.g., computing device 63; audio data from passive listening microphones (e.g., microphone 84) installed in mobile devices or other user computer devices (e.g., user computer system 62) to analyze tone and direct feedback; and video data from in-device cameras (e.g., camera 82) or other cameras in the cognitive story generating environment 50 to determine facial expression. In implementations, software on the cognitive server 60 can perform an analysis for each of the data points captured to normalize the emotions for a given user. The output of the analysis is knowing a specific user's emotion for a given "story segment". In aspects, the cognitive server 60 maps emotion metadata to the story segment, and maps metadata for a given user profile (stored in the user profile database 66) such that the cognitive server 60 is configured to learn the type of emotional reaction a specific user has to story segments. Going forward, when a speaker (i.e. business presenter, teacher, storytelling to friend, etc.) is preparing a presentation utilizing the cognitive server 60, they can provide input on the types of emotion they are seeking to achieve from a story. For example, a user may define the emotion of Story A as: a segment 1=inspiring; segment 2=happy; segment 3=sad; etc. In embodiments, software of the cognitive server 60 determines all possible stories that could be constructed from story segments for a given topic to invoke the desired emotion for a target audience. The software will then provide a presenter of the story with the initial optimized version of the story, including story segments to achieve the desired target user emotions.

Based on the above, it can also be understood that embodiments of the invention provide software for associating learned real-time emotional feedback of audience members with story segments as stored metadata. In implementations, at runtime, the cognitive server 60 identifies audience members participating in a story session. In embodiments, software of the cognitive server 60 captures emotions of audience members and maps the emotions for each story segment. Additionally, software compares the emotions of the audience members against previous or historical data for each story segment of the story. In aspects, the software learns the effectiveness regarding invoking emotions of audience members for a given story segment iteratively, thus the more instances the greater the confidence level of emotion mapping for each story segment. In embodiments, the software learns variations in emotions for different demographics of audience members in the event there are differences that impact the desired emotion versus real-time emotion for a given story/story segment. In implementations, the story segment emotion mapping learned will be stored as metadata for each story segment for future dynamically creation of story of story segments for a desired emotion.

Based on the above, it can also be understood that embodiments of the invention provide software to compare real-time emotional feedback of audiences during a story session with desired story emotions, and dynamically modify the story's path from available story segments to achieve a desired audience emotion(s). In aspects, a speaker starts with a dynamically generated story made up of segments for the desired emotion that is generic based on previous evaluation of emotions of audience members to that story segment. At runtime, the software compares the real-time emotional feedback of the audience during the story with desired audience reactions. In aspects, if the current story is not achieving the desired emotion at a threshold level defined, the presenter of the story has the option to enable/disable dynamic generation of a modified story in real-time to better achieve the desired emotion for the current audience. In implementations, software of the cognitive server 60 regenerates the story from the segments available in the story database 70 based on learned emotions of the current audience (e.g., from the user profile database 66) and based on historical knowledge of the emotion associated with each story segment.

Figure 4:
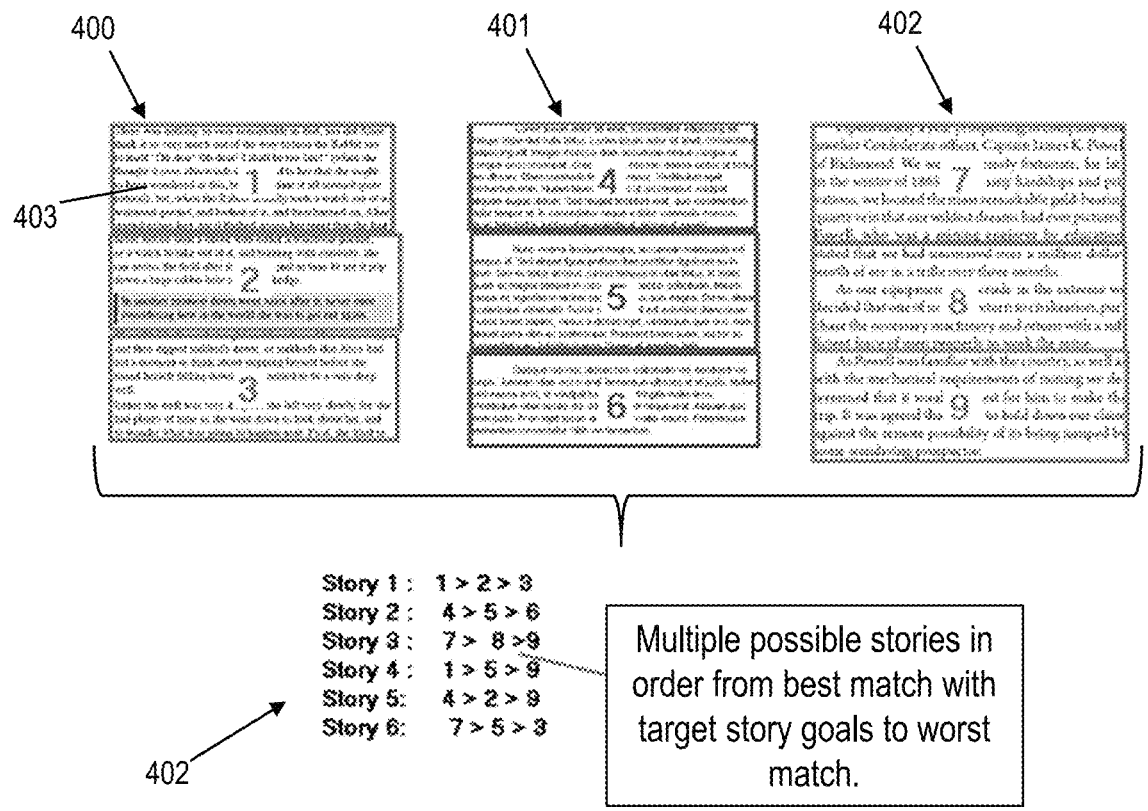
FIG. 4 illustrates an exemplary use scenario, wherein a plurality of story options are generated from predefined story segments.

FIG. 4 illustrates an exemplary use scenario, wherein a plurality of story options are generated from predefined story segments. The scenario of FIG. 4 is conducted in accordance with method steps of FIG. 3 in the cognitive story generating environment 50 of FIG. 2.

As depicted in FIG. 4, three stories 400-402 are contextually analyzed by the cognitive server 60 of the present invention. Each of the stories 400-402 has different story segments 403 identified, which are shown numbered 1-9. In accordance with step 308 of FIG. 3, each story segment is associated with user behaviors and/or emotions, based on real-time user data received in accordance with step 307 of FIG. 3. In the example of FIG. 4, the story segments are text based. Software of the present invention may be utilized to check if the identified story segments from different stories can be mixed to create new stories. In accordance with step 303 of FIG. 3, a plurality of story options 1-6 indicated generally at 402 are generated based on the categorized story segments 403 (predetermined story segments), wherein each story option comprises a unique combination of the story segments 403. In this example, stories 1-6 are ordered from best match with target story goals to worst match with target story goals.

When a person is telling a story, they often have a specific emotion or goal in mind such as influencing someone, making an audience laugh, provoking thought in audience members, etc. In accordance with embodiments of the invention, as a person is telling a story, software of the invention captures and correlates biometric feedback of the audience to determine if the current emotion is matching the emotional goal or behavior expected. In a case where the story is not achieving the expected feedback, software of the invention will generate an alternative story with different story segments that are intended to achieve the desired emotional or behavioral goal. For example, if listeners should be laughing after finishing a segment of a story, but the audience did not give the feedback expected, software of the invention may be induced to change the path of the story. One such scenario is illustrated at FIG. 5.

Figure 5:
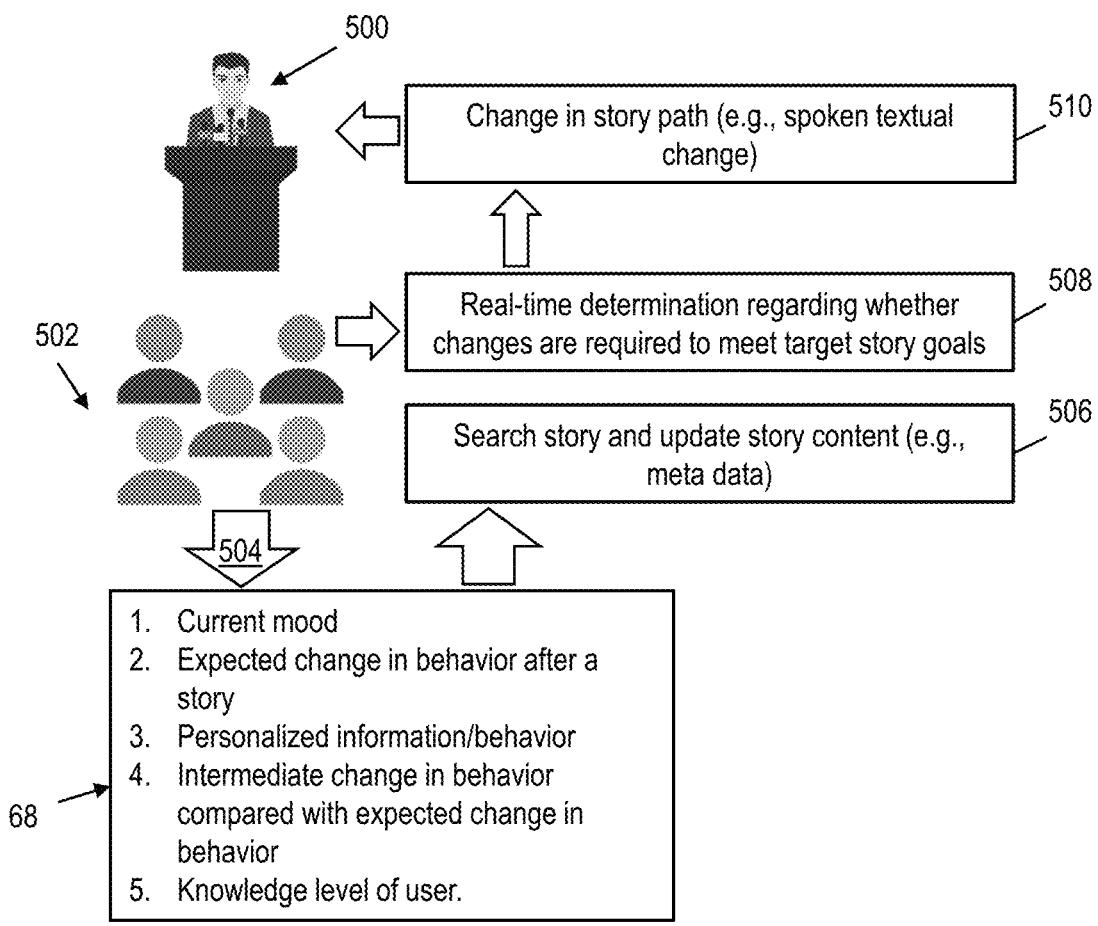
FIG. 5 is a flow diagram of method steps according to embodiments of the invention.

FIG. 5 is a flow diagram of method steps according to embodiments of the invention. Method steps illustrated in FIG. 5 are consistent with those of FIG. 3 and are performed in the environment of FIG. 2.

FIG. 5 illustrates a speaker 500 telling a story to a plurality of consumers 502 during a story session. The story may be an original story or a story auto generated by the cognitive server 60 in accordance with step 303 of FIG. 3. As illustrated, in embodiments, the context module 68 obtains user feedback data 504 from the consumers 502 in real-time during the story session. In aspects, the context module 68 determines: one or more of a current mood of each consumer; an expected change in behavior of the consumers 502 after the story session is concluded (e.g., the consumers should be amused based on target story goals); personal information or expected behavior with respect to each of the consumers 502 (e.g., based on user profile data in the user profile database 66 and/or mapping data in the story database 70); intermediate change in behavior (i.e., change in behavior during the story session) compared with expected changes in behavior; and a knowledge level of each of the consumers. As depicted, contextual information from the context module 68 may be utilized to update story content in the story database 70 (e.g., metadata of story segments are updated based on the real-time user feedback data 504), as illustrated at 506.

In the example of FIG. 5, the cognitive server 60 (depicted in FIG. 2) may determine that changes are required to the story to meet target story goals, as illustrated at 508, based on the real-time user feedback data 504. In this case, the cognitive server 60 automatically changes the story or story path in accordance with embodiments of the invention, as illustrated at 510, and provides the changes to the speaker 500.

In embodiments, a service provider could offer to perform the processes described herein. In this case, the service provider can create, maintain, deploy, and support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for dynamically modifying story content based on real-time user feedback data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In embodiments, a computer-implemented method for amending a story based on a desired user reaction includes: identifying a story to be presented and the intended emotional reaction by the audience; analyzing the story content to determine segments of the story and the intended emotional reaction for the segments, as well as possible alternative segments and the intended emotional reaction for the alternative segments; capturing the real-time emotional feedback of the audience via biometric and facial recognition for each segment of the presented story; comparing the captured emotional feedback for a segment to the intended emotional feedback for a story; and in response to determining that the capture emotional feedback and the intended emotional feedback are not the same, modifying the story to an alternative segment that has the intended emotional feedback.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining, by a computing device, target story goals for a video story to be generated based on information received by a user;
   determining, by the computing device analyzing classified stored story segments, subsets of the classified stored story segments that match the target story goals for the video story to be generated, wherein each of the subsets of the classified stored story segments include associated context data;
   generating, by the computing device, the video story using a combination of the subsets of the classified stored story segments that match the target story goals, wherein the combination of the subsets of the classified stored story segments comprise multiple predefined story segments;

streaming, by the computing device, the video story to a user computer device;

receiving, by the computing device, real-time user feedback data of a consumer of the video story during a presentation period wherein the video story is being presented to the consumer;

determining, by the computing device in real time during the presentation period, that the real-time feedback data does not match the target story goals;

dynamically modifying, by the computing device, the video story during the presentation period based on the determining that the real-time feedback data does not match the target story goals, wherein the modifying replaces one or more of the multiple predefined story segments of the video story with one or more alternative predefined story segments and produces a modified video story different from the video story;

streaming, by the computing device, the modified video story to the user computer device during the presentation period;

determining, by the computing device, an effectiveness of at least one of the multiple predefined story segments with respect to meeting a story goal of the at least one of the multiple predefined story segments for each of a plurality of different classes of consumer over time; and storing, by the computing device, confidence levels regarding the determined effectiveness with the at least one of the multiple predefined story segments.

2. The computer-implemented method of claim 1, wherein the one or more alternative predefined story segments each include context data regarding the effectiveness of a story segment with respect to different target story goals.

3. The computer-implemented method of claim 1, wherein the target story goals include multiple different emotions to be invoked in the consumer during the presentation period, and wherein the determining the subsets of the classified stored story segments that match the target story goals for the video story to be generated comprises matching the multiple different emotions to context data of each classified stored story segment in the subsets of the classified stored story segments.

4. The computer-implemented method of claim 1, wherein the information received by the user is a class of consumer.

5. The computer-implemented method of claim 1, further comprising:

generating, by the computing device, a plurality of combinations of subsets, wherein each of the plurality of combinations of subsets is an alternative story; and presenting, by the computing device, the plurality of combinations including the video story to the user computer device for selection prior to streaming the story.

6. The computer-implemented method of claim 5, further comprising ranking, by the computing device, the plurality of combinations of subsets, wherein the presenting the plurality of combinations comprises presenting the ranking of the plurality of combinations of subsets based on a best fit with the target story goals or consumers.

7. A computer program product comprising a computer readable storage medium having program instructions embodied therewith, the program instructions executable by a computing device to cause the computing device to:

send an automated presentation of visual and text-based content directly to each of a plurality of consumers via respective user computer devices within a network;

obtain, in real-time, user feedback data of the plurality of consumers during a story session from the respective user computer devices within the network, wherein the automated presentation comprises a plurality of predefined story segments;

determine in real time during the story session that the real-time feedback data does not match a target story goal of the automated presentation;

dynamically modify the automated presentation during the story session, based on the determining that the real-time feedback data does not match the target story goal, wherein the modifying replaces one or more of the predefined story segments of the automated presentation with one or more alternative predefined story segments and produces a modified automated presentation different from the automated presentation;

send the modified automated presentation to the respective user computer devices within the network during the story session;

map consumer emotions derived from the user feedback data to target emotions of each of the predefined story segments of the automated presentation;

store metadata for each of the predefined story segments in a story database to produce categorized story segments, wherein the metadata is based on the mapping of the consumer emotions; and generate a new automated presentation from at least one of the categorized story segments based on the metadata matching a target emotion intended to be invoked by the new automated presentation.

8. The computer program product of claim 7, further comprising program instructions to cause the computing device to:

identify the consumers; and determine variations in metadata for each of the predefined story segments for a plurality of different consumer types.

9. The computer program product of claim 7, further comprising program instructions to cause the computing device to:

determine patterns of effectiveness with respect to the target emotions of the predefined story segments for different classes of consumers based on the stored metadata;

determine confidence levels regarding the effectiveness with respect to the target emotions of the predefined story segments for different classes of consumers; and save the confidence levels in the story database.

10. The computer program product of claim 7, further comprising program instructions to cause the computing device to:

determine a subset of the categorized story segments that match target story goals based on the metadata of the categorized story segments; and generate a plurality of stories based on the subset of categorized story segments, wherein each of the plurality of stories comprises a unique combination of categorized story segments from the subset of categorized story segments.

11. The computer program product of claim 10, further comprising program instructions to cause the computing device to:

present the plurality of stories to a user;

receive a selection of a select story of the plurality of stories from the user; and send the select story to one or more remote user computer devices in the network.

12. The computer program product of claim 10, further comprising program instructions to cause the computing device to rank each of the plurality of stories based on how well each of the plurality of stories matches the target story goals.

13. The computer program product of claim 10, further comprising program instructions to cause the computing device to determine the target story goals based on user information received from a user, wherein the user information is selected from the group consisting of: a category of consumer; a category of a presenter of the story;
target story content; an intended emotion of the consumer; an intended reaction of the consumer;
and combinations thereof.

14. A system comprising:
a processor, a computer readable memory and a computer readable storage medium associated with a computing device;
program instructions to receive user information from a user, including a target emotion to be invoked in a consumer and a category of consumer for which a story to be generated is intended;
program instructions to determine target story goals for the story to be generated based on the user information;
program instructions to determine a subset of classified story segments from a plurality of available classified story segments in a story database, wherein the subset of classified story segments is associated with context data for the category of consumer that matches the target story goals;
program instructions to generate, in response to receiving the user information, a plurality of stories based on the subset of classified story segments, wherein each of the plurality of stories comprises a unique combination of classified story segments from the subset of classified story segments;
program instructions to stream a select story of the plurality of stories to a remote user computer device in a network, wherein the select story is comprised of multiple classified story segments;
program instruction to receive real-time user feedback data of a consumer of the select story during a presentation period wherein the select story is being presented to the consumer;
program instructions to determine, in real time during the presentation period, that the real-time feedback data does not match at least one of the target story goals of the select story; and
program instructions to dynamically modify the select story during the presentation period based on the determining that the real-time feedback data does not match the target story goal, wherein the modifying removes one or more of the multiple classified story segments of the select story and produces a modified select story different from the select story; and
program instructions to stream the modified select story to the remote user computer device during the presentation period;
wherein the program instructions are stored on the computer readable storage medium for execution by the processor via the computer readable memory.

15. The system of claim 14, further comprising program instructions to rank each of the plurality of stories based on how well each of the plurality of stories match the target story goals.

16. The system of claim 14, wherein the target story goal includes a goal to invoke an emotion in a consumer, wherein the real-time user feedback data comprises biofeedback data from a wearable device of the consumer, and wherein the program instructions to determine that the real-time feedback data does not match a target story goal of the select story comprise instructions to derive emotion data from the biofeedback data and determine that the emotion data does not match the emotion of the target story goal.

17. The system of claim 16, wherein the dynamically modifying the select story further comprises replacing one or more of the multiple classified story segments of the select story with one or more alternative classified story segments of the subset of classified story segments to produce the modified select story.

18. The system of claim 17, wherein dynamically modifying the select story further comprises modifying the select story to add one or more alternative story segments from the subset of classified story segments.

19. The system of claim 14, wherein the user information further comprises a category of a presenter of the story.

* * * * *